United States Patent [19]
Grüneberg

[11] 3,727,456
[45] Apr. 17, 1973

[54] APPARATUS FOR THE STRENGTH- AND LIFE-TEST OF HYDRAULIC STRUCTURAL ELEMENTS

[75] Inventor: Helmut Grüneberg, Bremen, Germany

[73] Assignee: Aviatest GmbH, Dusseldorf, Germany

[22] Filed: Feb. 2, 1971

[21] Appl. No.: 111,878

[30] Foreign Application Priority Data

Feb. 11, 1970 Germany...............P 20 06 092.8

[52] U.S. Cl....................................................73/168
[51] Int. Cl..............................................G01m 19/00
[58] Field of Search.......................73/168, 37, 4 R, 73/12

[56] References Cited

UNITED STATES PATENTS 3,106,084   10/1963   Hoffman...............................73/4 R
3,098,382    7/1963   Hoffman................................73/168

*Primary Examiner*—Louis R. Prince
*Assistant Examiner*—Denis E. Corr
*Attorney*—Ernest G. Montague

[57] ABSTRACT

An apparatus for the strength- and life-test of hydraulic structural elements which comprises a pulse generator which produces periodically a pressure-time curve. An electro-hydraulic servo-valve is provided. A pressure device follows the servo-valve. A nominal-actual-value-comparison circuit is arranged and the pulse generator operates the pressure device, whereby the latter is adapted to transmit the produced pressure to a testing member, and to readjust the same simultaneously by means of the nominal-actual-value-comparison circuit automatically. A function generator is provided which comprises a rectangle wave signal generator producing a low electric voltage with low frequency and a function transformer following the generator. The function transformer produces an impulse corresponding with a dampening sinus function by feeding an inpulse from the rectangle wave signal generator. The impulse produced by the function transformer is fed as nominal value to the servo-valve. A pressure device follows the servo-valve and affects a member to be tested, and a pressure receiver receives equal pressure from the pressure device, whereby the pressure measured on the pressure receiver is transformed into an electric impulse and is returned as actual value into the servo-valve.

4 Claims, 1 Drawing Figure

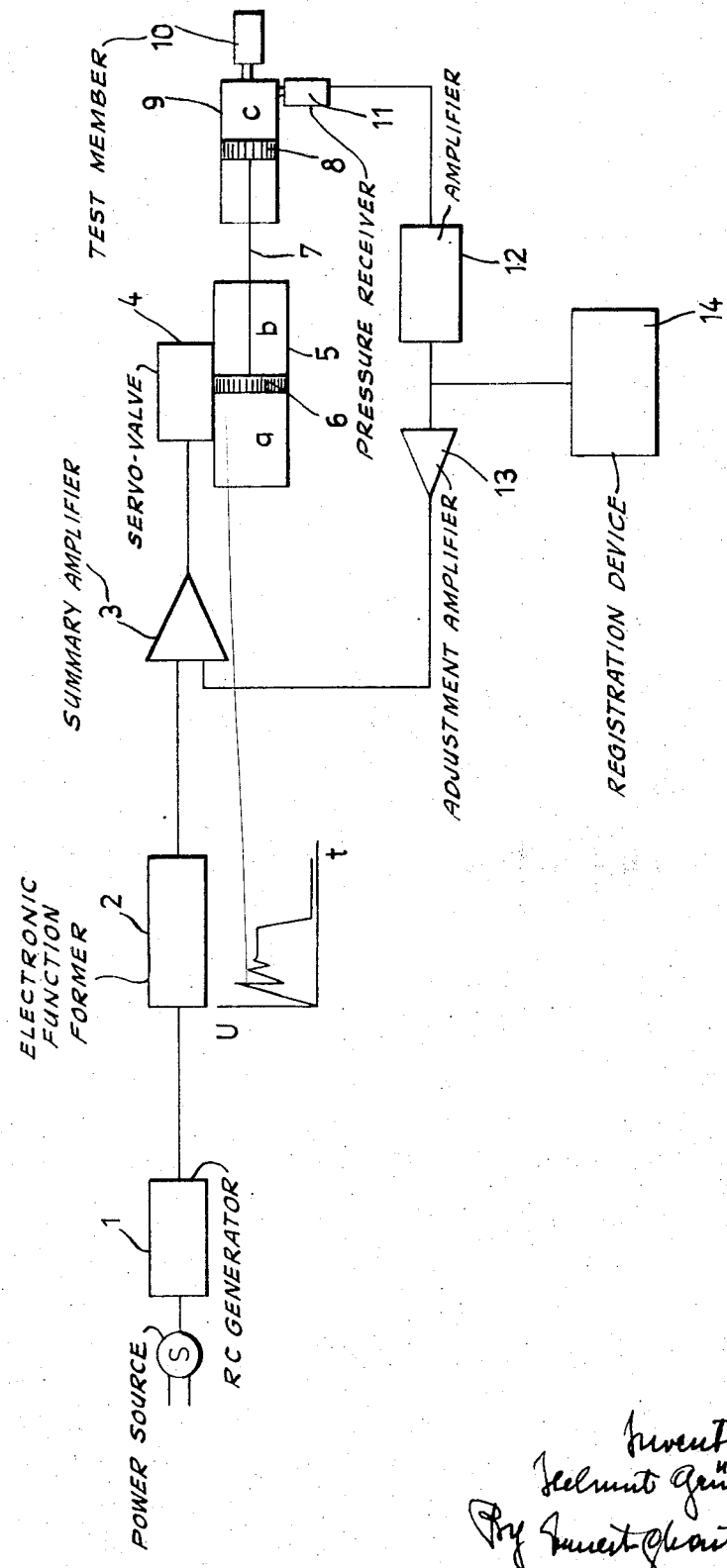

APPARATUS FOR THE STRENGTH-AND LIFE-TEST OF HYDRAULIC STRUCTURAL ELEMENTS

The present invention relates to an apparatus for the stength- and life-test of hydraulic structural elements, in general, and to such apparatus which finds its use, in particular, in air- and space-travel devices, yet also in the other industry. The size of the pressure jolt required for the testing in form of a pressure-time-function can be taken from the prevailing test descriptions of structural elements.

In the known testing devices, mechanically hydraulically structural elements are used, in which suitably designed cam disks transmit during rotation their unequalness to a hydraulic cyliner and the thus produced pressure differences to a following structural element to be tested. In case of a desired variation of the pressure-time-function, an exchange of the cam disk is necessary. Unequalness in the form of pressure level deviations, which require a correction, necessitate a mechanical adjustment and, thereby, a continuous observation of the testing device during the test. Furthermore, by the most voluminous structure and the acceleration of greater masses, the installed output is necessarily large. Furthermore, the high wear, which occurs at the cam disk by the engagement of the piston of the hydraulic cylinder operates in an unfavorable manner.

It is one object of the present invention to provide an apparatus for the strength- and life-test of hydraulic structural elements with fast and simple adjustability in relation to all set requirements, with a high uniformity of the test, with reduced wear, reduced energy requirement, reduced possibility of disturbance, smaller structure and low cost expenditure.

It is another object of the present invention to provide an apparatus for the strength and life-test of hydraulic structural elements, which includes a function generator which comprises a rectangular wave pulse generator producing periodically a low electrical voltage with lower frequency and a function transformer, following the generator, in which function transformer an impulse is produced corresponding with the dampening sine function by feeding an impulse produced by the rectangle wave pulse generator, which corresponding impulse is fed as a nominal value into the electro-hydraulic servo-valve, as well as by means of a pressure device effecting the member to be tested and following the servo-valve and a pressure receiver applied from the pressure device with equal pressure, whereby the pressure measured on the pressure receiver is transformed to an electrical impulse and is returned as an actual-value into the servo-valve.

By the use and arrangement in accordance with the present invention of the electronic structural parts for the production of the pressure-time-curve and the electro-hydraulic nominal-actual-value-comparison circuit, not only a permanent curve form is assured over a long testing period, but also the fastest setting of any other desirable curve shape is made possible. A wear, as in mechanically-hydraulic structural elements does not occur in electronical structural parts, so that each curve form can be exactly reproduced at any time. The measurements of the electronic structural parts are smaller by a multiple than the corresponding mechanical hydraulic elements. Furthermore, electronic structural elements are essentially more favorable as to price.

In accordance with a further feature of the present invention a summary amplifier is preset to the servo-valve. This summary amplifier serves the purpose to provide the output required for the operation of the servo-valve. In addition to the nominal value, also the actual value is fed to the servo-valve which values are transformed to set the course for the servo-valve. Thus a continuous, automatic after control for the previously set nominal value takes place.

In order to transform the minimum voltage variations which occur at the pressure receiver during operation of the device into an exploitable value for the nominal-actual-value-comparison-circuit, in accordance with the present invention, one or a plurality of amplifiers follow the pressure receiver. The size of the actual value is thus transformed into a size adequate to the nominal value, since only in this manner a true result is obtained.

In order to permit the working of such device without continuous control, in accordance with the present invention, the impulse jolt curve is traced by a registration device. By this arrangement, after the performed strength and life-test of the hydraulic structural elements, a control can be exerted, whether the prescribed testing conditions have been maintained, as well as the proof can be provided for the performed test.

With these and other objects in view, which will become apparent in the following detailed description of the present invention will be clearly understood in connection with the accompanying drawing in which the single Figure discloses the apparatus designed in accordance with the present invention by example only.

Referring now to the drawing, a R-C-generator 1 connected with a power source S is connected with an electronic function former 2, which is known per se as to its structure, which is in connection in turn by means of a commercially available summary amplifier 3 and a servo-valve 4 with a working cylinder 5. In this working cylinder 5 a piston 6 is displaceably mounted, which divides the working cylinder into the pressure chambers a and b. A piston rod 7 is secured to the piston 6, and a piston 8 is provided at the free end of the piston rod 7, which piston 8 is guided in a cylinder 9. In front of the piston 8 in the cylinder 9 is a pressure chamber c, to which is connected a member 10 to be tested and a pressure receiver 11, which transforms hydraulic pressure jolts into electric impulses. Over a TF- or other suitable amplifier 12 and under circumstances a further adjustment amplifier 13 which is known per se, the pressure receiver 11 is connected with the summary amplifier 3. Simultaneously, between the amplifier 12 and the summary amplifier 3 is connected a registration device 14.

The operation of the apparatus takes place as follows:

The R-C generator 1 produces a low rectangular voltage. By this rectangular signal the desired pressure-time curve is produced in form of a voltage-time-function in the function former 2, the value of the voltage-time-function being shown by example below the function former 2, and which is fed to the summary amplifier 3.

The output signal of the summary amplifier 3 serves as input signal of the servo unit. Depending upon the polarity of this voltage the servo-valve 4 controls the pressure oil of a hydraulic feeding unit into the pressure chambers $a$ or $b$ of the working cylinder 5. In case of a pressure build-up, the chamber $a$ is effective upon the piston with a force arrived at by the area of the piston face times pressure. This force causes in the pressure chamber $c$ of the second cylinder 9, a predetermined pressure corresponding with its corresponding piston face. This pressure is effective directly upon the test member 10. The pressure receiver 11 which is connected to the cylinder 9 transforms the pressure prevailing in the pressure chamber $c$ into an electric voltage and returns the latter over the TF-amplifier and the adjustment-amplifier 13 to the summary amplifier 3, in which a nominal-actual-value-comparison takes place.

Variations of the test-load are settable by variations of the voltage-time function fast and simply on the function former 2. Variations of the pressure points are possible by variation of the amplifying factors of the summary amplifier 3, as well as the adjustment amplifier 13 likewise in a simple manner.

For the control and documentation, the produced pressure behavior curve is retained in the registration device 14, the structure of which is likewise of a type known per se.

While I have disclosed one embodiment of the present invention, it is to be understood that this embodiment is given by example only and not in a limiting sense.

I claim:

1. An apparatus for the strength- and life-test of hydraulic structural elements, comprising
   an electro-hydraulic servo-valve,
   a pressure means following said servo-valve and responsive thereto and transmitting pressure to a member to be tested,
   a nominal-actual-value-comparison circuit means operatively connected to the input of said servo-valve, and the output of said pressure means,
   a function generator comprising a low voltage, low frequency rectangular wave pulse generator producing pulses and a function transformer means responsive to said function generator and connected thereto to produce for each of said pulses a predetermined control impulse corresponding with a dampened sine function and being fed as a nominal value,
   said nominal-actual-value-comparison circuit means being responsive to said function transformer means,
   said nominal-actual-value-comparison circuit means including a pressure receiver means responsive to the output of said pressure means for receiving pressure jolts from said pressure means and for providing a corresponding electric impulse constituting an actual value, and
   said nominal-actual-value-comparison circuit means comparing said electric impulse constituting said actual value with said control impulse from said function transformer means constituting said nominal value and producing an adjusted impulse fed to said servo-valve, the latter to operate said pressure means for transmitting adjusted pressure jolts to said member to be tested.

2. The apparatus, as set forth in claim 5, wherein said nominal-actual-value-comparison circuit means including
   a summation amplifier producing said adjusted impulse and preceding said servo-valve and connected thereto and receiving and comparing said control impulse constituting said nominal value from said function transformer means and said electrical impulse constituting said actual value.

3. The apparatus, as set forth in claim 1, wherein said comparison circuit means including at least one amplifier following said pressure receiver means and connected thereto.

4. The apparatus, as set forth in claim 1, which includes
   a registration means for tracing the impulse jolt curve produced by said pressure receiver means.

* * * * *